March 17, 1931.  C. C. WILSON  1,796,677
SAUSAGE MIXING AND STUFFING ATTACHMENT FOR MEAT CUTTING MACHINES
Filed Jan. 15, 1930
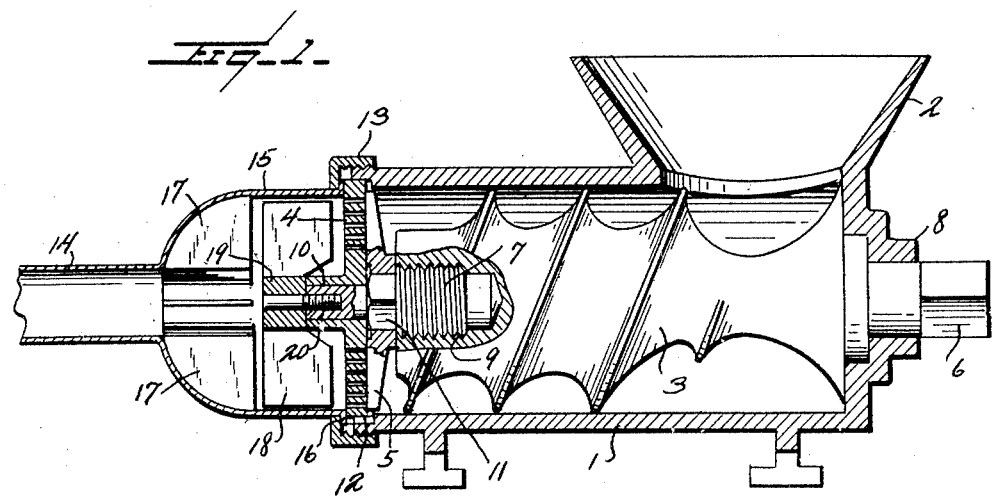
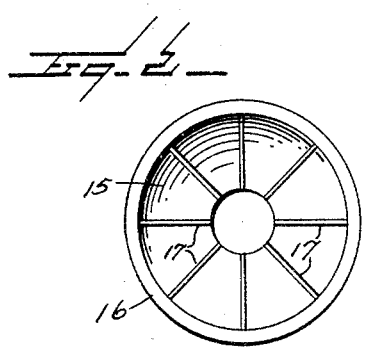
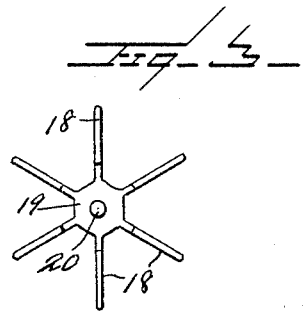
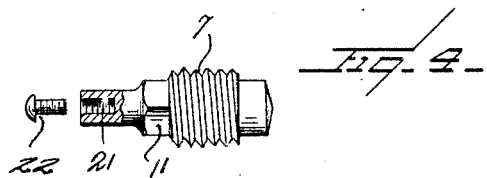
Inventor
C. C. Wilson
By Watson E. Coleman
Attorney Patented Mar. 17, 1931

1,796,677

UNITED STATES PATENT OFFICE

CECIL C. WILSON, OF LEWISTON, PENNSYLVANIA

SAUSAGE MIXING AND STUFFING ATTACHMENT FOR MEAT-CUTTING MACHINES

Application filed January 15, 1930. Serial No. 420,962.

This invention relates to an attachment for meat cutting machines, and has for one of its objects to provide an attachment through the medium of which a machine of this character may be used for the purpose of cutting, mixing and stuffing sausage meat.

The invention has for a further object to provide a sausage meat mixer and stuffing attachment which shall be simple, durable, highly efficient, and capable of being readily attached to a meat cutting machine.

To attain the foregoing and other objects, the nature of which will appear as the description proceeds, the invention comprehends the provision of a sausage meat mixing and stuffing attachment which shall embody a horn adapted to be secured to the discharge end of a meat cutting machine and adapted to have the casings applied thereto, a series of relatively fixed mixing blades arranged in the horn and a series of relatively movable mixing blades adapted to be secured to the feed screw of the cutting machine for movement therewith.

The invention is hereinafter more fully described and claimed, and illustrated in the accompanying drawing, wherein:—

Figure 1 is a sectional view taken on a vertical plane extending longitudinally and centrally through a meat cutting machine equipped with a sausage mixing and stuffing attachment constructed in accordance with my invention;

Figure 2 is a view in end elevation of the horn and relatively fixed mixing blades;

Figure 3 is a view in side elevation of the relatively movable mixing blades, and Figure 4 is a view in side elevation of a stud adapted to secure the relatively movable mixing blades to the feed screw of a meat cutting machine.

Referring in detail to the drawing, 1 designates the cylinder, 2 the hopper, 3 the feed screw, 4 the perforated plate, and 5 the knife of a meat cutting machine of well known construction. The feed screw 3 is provided at its rear end with a power stud 6, and at its front end with a plate stud 7. The power stud 6 is journaled in the bearing 8 carried by the rear wall of the cylinder 1, and has connected thereto the driving means, not shown, which may consist of a hand crank, electric motor or the like. The plate stud 7, which is screw threadedly engaged in a socket 9 formed in the front end of the feed screw 3, is journaled in a bearing 10 carried by the perforated plate 4, and is provided with an angular shoulder 11 upon which the cutter 5 is removably mounted. The perforated plate 4 is arranged in the front or discharge end of the cylinder 1, it is held against rotation by a pin 12, and it is maintained in place by a ring 13 screw threadedly engaged with the cylinder.

The sausage meat mixing and stuffing attachment comprises a horn 14 which is adapted to have an end of the sausage casing slipped thereover and is adapted to convey the sausage ingredients from the cutting machine to the casing.

That end of the horn 14 attached to the cutting machine is diametrically enlarged to provide a receiving and mixing chamber 15. The rear portion of the chamber 15 is cylindrical, and the front portion thereof is spherical. The chamber 15 is provided at its rear end with a flange 16 which rests against the perforated plate 4 and is engaged by the ring 13 to secure the horn 14 to the mixing machine.

A series of relatively spaced mixing blades 17 are arranged in the spherical portion of the chamber 15, and a series of relatively movable mixing blades 18 are arranged in the cylindrical portion of the chamber. The blades 17 are of sector formation, and have their arcuate edges arranged in contact with and fixed in any suitable manner to the spherical wall of the chamber 15. The inner or axial edges of the blades 17 are arranged in alinement with the inner surface of the horn 14, and the rear or radial edges of the blades are arranged at the juncture of the spherical and cylindrical portions of the chamber 15. The blades 18 are fixed to and radiate from a hub 19. A screw theaded stud 20 carried by the hub 19, and engaging in a screw threaded socket 21 formed in the outer end of the plate stud 7 secures the blades 18 to the feed screw 3 for rotation by and with the latter. The screw threads of the blade stud 20 run in the direction of the rotation of the feed screw 3 in order to prevent the accidental disconnection of the blades 18 from the feed screw.

In practice, the meat from which the sausages are to be made is cut up and placed, together with the seasoning, in the hopper 2, and these ingredients are passed from the hopper into the cylinder 1. The feed screw 3 forces the ingredients in the direction of and through the perforated plate 4, the cutter 5 rotates against the rear side of the plate and finely divides the ingredients as they pass through the plate. The cut or chopped ingredients passing through the perforated plate 4 are received by the chamber 5, and pass through the chamber into the horn 14 from whence they may pass into the casing. During their passage through the chamber 15, the cut or chopped ingredients are thoroughly mixed by the relatively fixed and movable blades 17 and 18, respectively. As the mixing chamber 15 is larger diametrically than the horn 14, and as that portion thereof in which the relatively fixed blades 17 are arranged gradually reduce in diameter in the direction of the horn, the flow of the ingredents through the chamber will be retarded. In view thereof, as the relatively fixed blades 17 are diametrically arranged within the mixing chamber 15, and as the relatively movable blades 18 rotate in a path at right angles to the relatively fixed blades into the openings in the plate 4, the ingredients will be thoroughly and uniformly mixed.

This attachment may be used for the purpose of mixing and stuffing all kinds of sausage, such as bolognas, frankfurters, puddings and the like, and for the purpose of mixing meats or other ingredients of any kind and stuffing them in casings.

The attachment reduces at least fifty per cent of the time and labor now involved in cutting, mixing and stuffing sausage meat, due to the fact that it renders it only necessary to cut the meat but once, grinds the meat, mixes the meat and the seasoning, and delivers the mixed ingredients to the casings. The attachment will mix and stuff the ingredients at the full rated capacity of the cutting or grinding machine it is used on, and it may be made in different sizes for application to the different size cutting or grinding machines.

To adapt a meat cutting or grinding machine for the application thereto of the attachment, it is only necessary to remove the perforated plate retaining ring and plate, the plate stud, and cutter of the machine. After this has been done, the plate stud 7 forming a part of the attachment, which stud is similar to the one removed from the machine, with the exception that it is provided in its outer end with the screw threaded socket 21, is threaded into the feed screw of the machine. The cutter is then mounted upon the plate stud, and the perforated plate restored to its place in the machine. The movable blade unit is now engaged with the plate stud, and thereafter the horn 14 is applied and secured in applied position by the plate retaining ring of the machine.

When it is desired to use the machine merely for the purpose of cutting meat, it is only necessary to remove the horn 14 and the movable blades 18, the plate stud 7 remaining in place to support the cutter 5 and the front end of the feed screw 3. To prevent the accumulation of meat in the socket 21 of the plate stud 7, the socket is closed by the screw 22 shown in Figure 4.

While I have described the principle of the invention, together with the device which I now consider the preferred embodiment thereof, it is to be understood that the device shown is merely illustrative and that such changes may be made, when desired, as fall within the scope of the invention as claimed.

I claim:—

1. In combination, a meat cutting machine having a feed screw, cutter and perforated plate, a horn secured to the machine to receive the cut meat passing through the plate, rotating mixing blades located in advance of the mixing plate and within the horn, means securing the blades to the feed screw, and mixing blades fixed to and within the horn in advance of said first blades.

2. In combination, a meat cutting machine having a feed screw, cutter and perforated plate, a horn having an enlarged end and secured to the machine to position said end in advance of the plate, rotating mixing blades arranged in advance of the plate and within said end of the horn, means securing the blades to the feed screw, and stationary mixing blades arranged within said end of the horn in advance of said first blades.

3. In combination, a meat cutting machine having a feed screw, cutter and perforated plate, a horn having a diametrically enlarged end provided with a cylindrical rear portion and a spherical front portion, means securing the horn to the machine with said end thereof arranged in advance of the plate, movable mixing blades arranged in advance of the plate and within the cylindrical portion of said end of the horn, means securing the blades to the feed screw, and stationary mixing blades arranged within the spherical portion of said end of the horn.

4. In combination, a meat cutting machine having a feed screw, cutter and perforated plate, a horn having a diametrically enlarged end provided with a cylindrical rear portion and a spherical front portion, means securing the horn to the machine with said end thereof arranged in advance of the plate, movable mixing blades arranged in advance of the plate and within the cylindrical portion of said end of the horn, means securing the blades to the feed screw, and stationary mixing blades arranged within the spherical portion of said end of the horn, said last mixing blades being arranged diametrically within the spherical portion of said end of the horn and having their axial edges arranged in alinement with the inner surface of the remaining portion of the horn.

5. In combination, a meat cutting machine having a feed screw, cutter and perforated plate, a horn having an enlarged end secured to the machine with said end thereof in position to receive the cut meat passing through the plate, the forward portion of said enlarged end of the horn gradually decreasing in size in the direction of the horn, fixed mixing blades arranged within said end of the horn, movable mixing blades arranged within said end of the horn between the perforated plate and said first blades, and means securing the movable blades to the feed screw.

In testimony whereof I hereunto affix my signature.

CECIL C. WILSON.